Patented Feb. 13, 1951

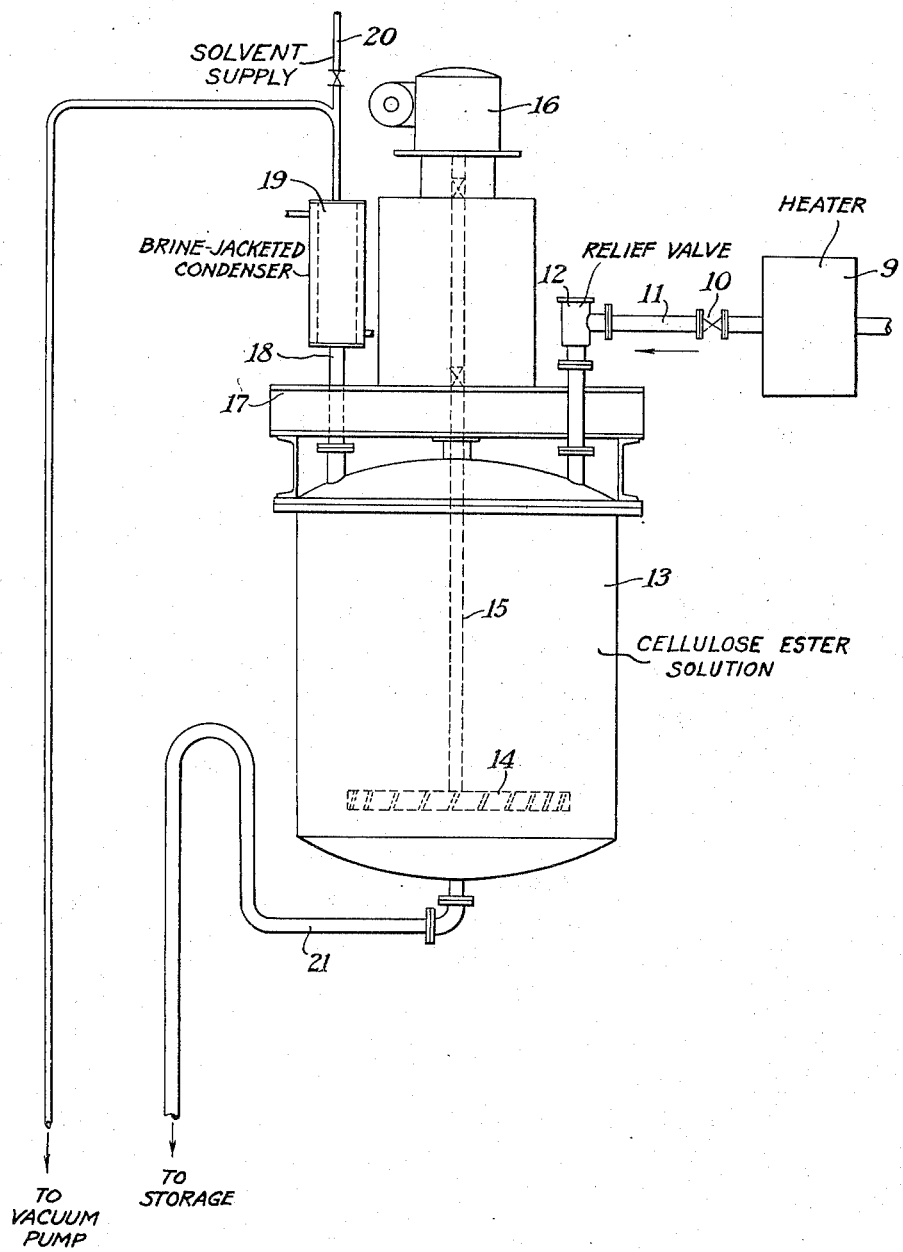

UNITED STATES PATENT OFFICE 2,541,012

METHOD OF PREPARING A VISCOUS CELLULOSE ACETATE SOLUTION

Richard W. Bruins and Walker F. Hunter, Jr., Rochester, N. Y., assignors to Eastman Kodak Company, Rochester, N. Y., a corporation of New Jersey Application August 6, 1947, Serial No. 766,851

1 Claim. (Cl. 106—198)

This invention relates to a method of cooling hot viscous cellulose ester solutions which at normal temperatures are highly viscous and which are employed in making photographic film base, yarn, thin sheeting and the like.

The manufacture of photographic film base particularly requires that the casting solution or "dopes" which are cast into the base sheet be of uniform composition and be free of impurities. Similarly in spinning acetate yarn through microscopic spinnerettes, the spinning solution must be free from impurities and undissolved ester particles. In order to obtain a uniform solution the solvent and the cellulose ester, or resin as the case may be, are often heated to relatively high temperatures to induce solubility. Solutions are also filtered to remove any undissolved materials or foreign matter which may be present. Since the solutions at normal atmospheric temperatures are highly viscous moderate heating is generally employed to reduce their viscosity to facilitate filtering. For example, a solution having a viscosity of 60,000 cps. at 100° F. has a viscosity of 3000 cps. at 200° F. and 750 cps. at 250° F. Hence, if one could heat the solution to such raised temperatures filtration rates 100 times those employed at present during filtering would be practical. After the solution is heated and filtered, considerable effort must be expended to cool the hot filtered solution down to a temperature so that it may be employed substantially at the predetermined viscosity in the film casting process. Of course the higher temperature employed increases the problem and difficulty of such cooling. The problem is complicated by the fact that as the solution cools its viscosity increases and, therefore, the rate of cooling proportionally decreases when employing conventional heat exchangers. Usually the cooling of the hot viscous solution is accomplished by some modification of shell and tube coolers which are operated at low rates because of the increase in the viscosity of the material as it is being cooled. The pressure drop through such a cooler is usually high and multiple sections are used to reduce the pressure drop. These coolers have given difficulty and are costly to install and service. When employing certain solutions of very high viscosity, the section of the solution adjacent the cold wall of the tube hardens while only the center section remains flowable. Eventually all flow may cease.

An object, therefore, of the present invention is an improved and rapid method of cooling hot fluids and solutions.

Another object is a method of continuously cooling hot viscous fluids and solutions.

Another object of the invention is a method of cooling hot viscous fluids which is substantially not affected by viscosity increases of the fluids during cooling.

Still another object of the invention is to provide a method of simultaneously cooling viscous solutions and adjusting the viscosity thereof. Other objects will appear hereinafter.

In accordance with the invention, the hot viscous solution or liquid to be cooled is maintained at a temperature above the atmospheric boiling point of the fluid or solvent of the solution, as the case may be, and under a pressure at which the fluid or solvent does not boil. The pressure on the fluid or solution is then suddenly reduced to a pressure at which the hot fluid boils violently and expels volatile portions of the fluid or solvent. This expulsion and vaporization results in a considerable temperature drop in the remaining fluid or solution and further cooling can be accomplished by condensing the expelled vapors of the volatile fluids or solvents and returning all or a portion thereof to the cooled viscous material. When all of the condensed solvent is returned the ratio of solid and liquid constituents of the solution is substantially like that in the original solution. At this point the final viscosity of the liquid or solution may be adjusted by adding more or less of the fluid or solvent than was initially present in the hot material. The temperature of this added or returned solvent may also be regulated in order to regulate the resulting temperature of the solution. If additional liquids or solvents are added, it is preferred that they be of the same purity as those resulting from the instant process. The solvents may be reincorporated in the solution by a mechanical stirrer. The cooled solution is then withdrawn from the tank. This process can be operated continuously.

The invention is further illustrated in connection with the attached drawing showing a schematic view in elevation of apparatus suitable for use in carrying out the process.

As shown in the drawing the apparatus comprises a solution heater 9 in which the solution may be heated above its boiling point while being maintained at a pressure at which boiling cannot take place. When the temperature and pressure of the solution is at a predetermined value, valve 10 in pipe line 11 is opened permitting the solution to flow through a pressure reducing valve 12 and thence into cooling tank 13 which is maintained at a pressure lower than that in the heater 10. Tank 13 has associated therewith a stirrer 14 whose shaft 15 is attached to a motor 16 which is mounted on a support 17 which also supports the tank 13. A vapor exhaust pipe 18 is connected adjacent the top of the tank 13 and leads through condenser 19. If desired, a vacuum pump system not shown may be attached to pipe 18 in order to reduce the pressure in tank 13 to a sub-atsmospheric pressure. A solution draw-off pipe 21 is attached to the bottom of tank 13 and is for conducting cooled solution to storage, or to the next operation such as a film coating process, as may be desired. It will be understood that our process can operate merely on a difference of pressure and that a pressure less than atmospheric in the tank 13 is not required. However, in certain instances it may be desirable to operate the process while tank 13 is at a pressure lower than atmospheric. In either case, when the hot solution under high pressure is forced into the low pressure atmosphere of tank 13 its liquid solvent boils violently throughout its mass and the vapors flow up into the cold condenser 19. This vaporization results in suddenly cooling the solution more or less uniformly throughout its mass. The mass is further cooled by the return of the condensed solvent which is reincorporated in the viscous mass by the stirrer 14. The cooled solution is withdrawn from the solution cooler system through pipe 21.

If it is desired to make the solution less viscous additional solvent may be introduced into tank 13 through pipe 20 which connects to pipe 18. The added solvent thus flows through condenser 19 on its way to tank 13. The temperature of this added solvent may be adjusted to a desired value by means not shown prior to the addition to pipe 20. If it is desired to increase the viscosity of the solution the condenser 19 may be run hot or at an intermediate temperature so that all the vapors do not condense and return to the tank. Suitable traps not shown for recovering the uncondensed vapors may be installed in the exhaust system before the vacuum pump is reached. It will be understood that a desired pressure in the heater 10 and a vacuum in the tank 13 may be obtained by appropriate operation of conventional pressure and vacuum apparatus, not shown.

The following are typical examples of the method applied to viscous cellulose ester solutions.

Example 1

A 25% solution of hydrolyzed cellulose acetate was made up using acetone as the solvent. Such a solution is suitable for use in the dry spinning method for making acetate yarn filaments by the method shown in Stone Patent 2,000,047 of May 7, 1935. This solution has a viscosity of approximately 100,000 cps. and in order to facilitate filtering it was heated to 200° F. and forced through a filter at a pressure of 100 pounds per square inch to remove undissolved cellulose acetate and foreign matter. At this pressure the acetone in the solution cannot vaporize. On passing through the filter it was introduced into the tank 13 through the above described pipe system. Tank 13 being maintained at atmospheric pressure now permits the pressure on the solution to drop (and a corresponding rise in temperature takes place in the solution) and substantial amounts of the acetone are suddenly flashed out of the solution as vapor. The cooling action of the vaporization plus the return of condensed solvent from the condenser 19 cools the resulting solution to a substantially lower temperature at which the dope can be forced through a spinnerette to form filaments. Other yarn forming solutions disclosed in Stone Patents 2,000,047 and 2,000,048 both of May 7, 1935, can be advantageously cooled from their solution mixing temperatures in accordance with our invention.

Example 2

A cellulose acetate butyrate film base coating solution such as disclosed in Carver Patent 2,322,827 of June 29, 1943, may be cooled from a temperature of 98° C., at which it was heated under a pressure at which the solvent does not vaporize to facilitate solution and filtering, to a film coating temperature of 60° C. by our novel process. The pressure drop was from 125 pounds per square inch to atmospheric. Other film solutions mentioned in this patent may be advantageously handled by our novel cooling method to reduce the temperature of the solution to a temperature at which the solution may be cast or stored.

Example 3

The cellulose acetate, cellulose acetate propionate, and cellulose acetate butyrate film base solutions disclosed in Fordyce Patent 2,295,280 of September 8, 1942, were advantageously cooled from the solution mixing and filtering temperatures to the casting temperatures by our process. These solutions may be filtered at pressures of 125 pounds per square inch at a temperature of 60° F. at which the solvents do not volatilize. The solution was then cooled in accordance with our invention by dropping the pressure to atmospheric in the apparatus illustrated.

While the above examples illustrate our invention by initially heating the solution under a pressure which is above that of the atmosphere, commonly called "atmospheric pressure," it is contemplated that the method can also be carried out by initially heating the solution while it is under a pressure which is equal to or below atmospheric pressure. In such event, the pressure of the tank 13 would be made sub-atmospheric by means of the vacuum pump system so that a pressure drop would occur permitting sudden vaporization of the volatile constituents in the solution or fluid being treated. An important feature is initially heating the solution to a temperature close to the boiling point of the solution at the particular pressure maintained in the heater, and then sufficiently reducing the pressure to a point at which the temperature of the solution will be at or above the boiling point at the reduced pressure. By increasing the temperture from which the solution is flashed the amount of condensed solvent is increased and hence its cooling action when mixed with solution at equilibrium temperature is increased. In this method, a solution is cooled to a lower temperature by evaporation of its solvents from a higher temperature.

We claim:

The method of preparing a highly viscous cellulose acetate solution containing a low boiling volatile solvent which comprises heating the solution to a temperature of 200° F. while maintaining a pressure on the solution of 100 lbs. per square inch, at which conditions the solvent will not volatilize, filtering the solution at this temperature and pressure, then abruptly releasing the pressure on the filtered solution thereby permitting the solvent to vaporize and consequently to cool the solution, condensing the vaporized solvent and re-incorporating a portion of the condensed solvent into the cellulose acetate solution to adjust its final viscosity.

RICHARD W. BRUINS.
WALKER F. HUNTER, Jr.

REFERENCES CITED

The following references are of record in the file of this patent:

UNITED STATES PATENTS

| Number | Name | Date |
| --- | --- | --- |
| 1,562,870 | Daniels | Nov. 24, 1925 |
| 1,578,802 | Clark | Mar. 30, 1926 |
| 1,752,853 | Russell | Apr. 1, 1930 |
| 1,976,535 | Atwell | Oct. 9, 1934 |
| 2,046,554 | Gay | July 7, 1936 |
| 2,353,991 | Boutwell | July 18, 1944 |